United States Patent
Friedrich et al.

(10) Patent No.: US 9,539,560 B2
(45) Date of Patent: Jan. 10, 2017

(54) METHOD FOR MANUFACTURING A PHOTOCATALYST BASED ON TITANIUM DIOXIDE CONTAINING CARBON OR METAL

(71) Applicant: Kronos International, Inc., Leverkuesen (DE)

(72) Inventors: Joerg Friedrich, Leichlingen (DE); Raimund Meifert, Duesseldorf (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 14/819,596

(22) Filed: Aug. 6, 2015

(65) Prior Publication Data
US 2016/0038916 A1    Feb. 11, 2016

(30) Foreign Application Priority Data
Aug. 7, 2014 (EP) .................... 14002766

(51) Int. Cl.
*B01J 21/06* (2006.01)
*B01J 37/34* (2006.01)
(Continued)

(52) U.S. Cl.
CPC .............. *B01J 21/063* (2013.01); *B01J 21/18* (2013.01); *B01J 23/745* (2013.01); *B01J 27/20* (2013.01); *B01J 35/004* (2013.01); *B01J 35/026* (2013.01); *B01J 35/1014* (2013.01); *B01J 35/1019* (2013.01); *B01J 37/009* (2013.01); *B01J 37/0072* (2013.01); *B01J 37/086* (2013.01); *B01J 37/349* (2013.01); *B01D 2255/20707* (2013.01); *B01D 2255/702* (2013.01); *B01D 2255/802* (2013.01)

(58) Field of Classification Search
CPC ....................................... B01J 21/063
See application file for complete search history.

(56) References Cited

U.S. PATENT DOCUMENTS

2008/0011195 A1    1/2008 Grochal et al.

FOREIGN PATENT DOCUMENTS

DE    102006046806        12/2007
DE    102006046806 A1 *  12/2007 .............. B01J 2/006
(Continued)

OTHER PUBLICATIONS

Translation of DE102006046806A1, 2007.*

*Primary Examiner* — Melvin C Mayes
*Assistant Examiner* — Stefanie Cohen
(74) *Attorney, Agent, or Firm* — Locke Lord LLP

(57) ABSTRACT

A method for manufacturing a photocatalyst, based on titanium dioxide containing carbon or metal, in a pulsation reactor, where a raw material mixture, consisting of nanoparticulate titanium oxyhydrate and an aqueous solution or suspension, containing at least one organic, carbon-containing compound or metal ions, is fed into the pulsating hot-gas stream of the pulsation reactor and the titanium dioxide particles containing carbon or metal are formed. The hot-gas stream has a temperature of ≥450° C. following addition of the material and contains an excess of oxygen. In contrast to the known manufacturing methods, the method according to the invention allows reproducibly good product qualities to be achieved.

26 Claims, 1 Drawing Sheet

(51) Int. Cl.
  *B01J 27/20* (2006.01)
  *B01J 35/00* (2006.01)
  *B01J 35/10* (2006.01)
  *B01J 21/18* (2006.01)
  *B01J 23/745* (2006.01)
  *B01J 35/02* (2006.01)
  *B01J 37/00* (2006.01)
  *B01J 37/08* (2006.01)

(56) References Cited

FOREIGN PATENT DOCUMENTS

| | | |
|---|---|---|
| DE | 102007003744 | 7/2008 |
| EP | 0600442 | 11/1993 |
| EP | 2218685 | 8/2010 |
| WO | WO 2005/118626 | 12/2005 |
| WO | WO2005/118726 | 12/2005 |

* cited by examiner

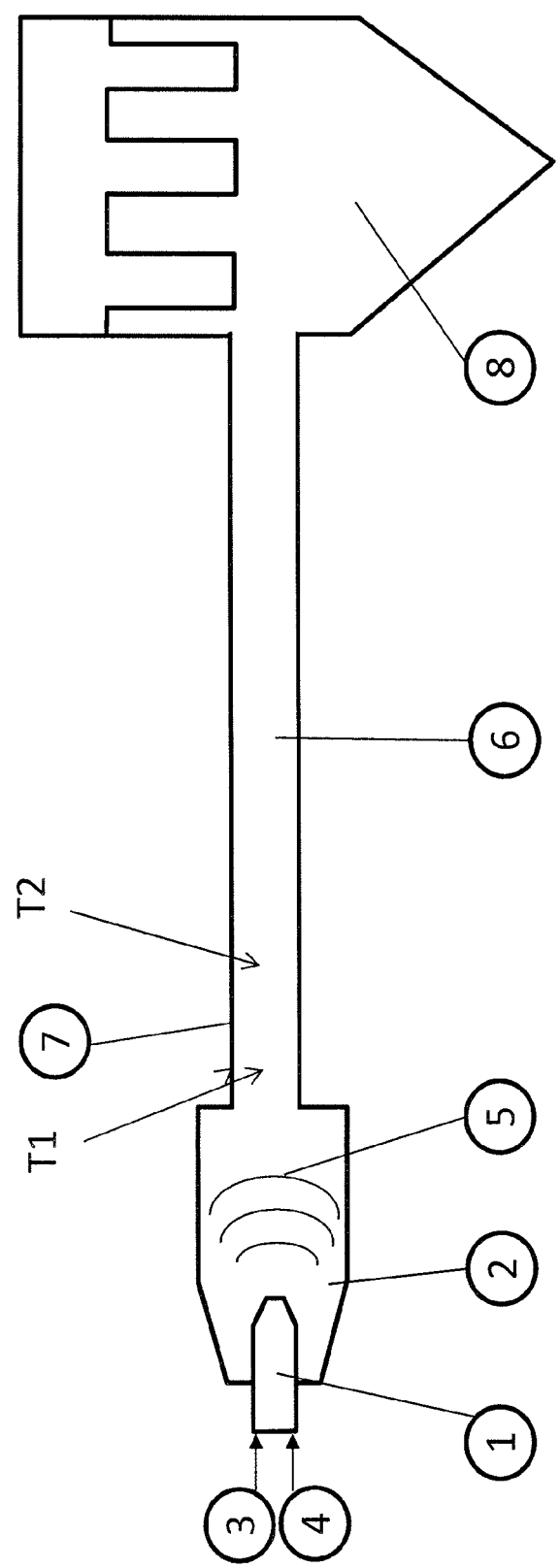

_(1)_

METHOD FOR MANUFACTURING A PHOTOCATALYST BASED ON TITANIUM DIOXIDE CONTAINING CARBON OR METAL

RELATED APPLICATIONS

This application claims the benefit of EP Patent App. No. 14002766.5 filed Aug. 7, 2014.

BACKGROUND

Field of the Invention

The invention relates to a method for manufacturing a photocatalyst based on titanium dioxide containing carbon or metal in a pulsation reactor.

Technological Background of the Invention

Photocatalytic materials are semiconductors in which, when exposed to light, electron-hole pairs are formed that generate highly reactive free radicals on the material surface. Titanium dioxide is a semiconductor of this kind. It is known that, by being irradiated with UV light, titanium dioxide can remove natural or artificial impurities in air and water in that the impurities are decomposed and/or oxidized (mineralized) to form environmentally friendly end products. One disadvantage of titanium dioxide is that the visible component of sunlight does not trigger any photocatalytic activity.

However, various procedures are known for modifying titanium dioxide in such a way that it can also utilize the visible component of sunlight in order to develop photocatalytic activity—e.g. doping or surface-coating of the titanium dioxide crystals with carbon, or with metal ions, such as Fe, V, Cr, etc.

WO 2005/108505 A1, for example, discloses a process for producing a carbon-containing, titanium dioxide-based photocatalyst that is photoactive in visible light. The process is based on a parent titanium compound, present in the form of an amorphous or semi-crystalline titanium oxide, hydrous titanium oxide, titanium hydrate or titanium oxyhydrate. The parent titanium compound is present in the form of either a fine-grained solid or a suspension and has a BET surface of at least 50 m²/g. The parent titanium compound is mixed with a carbon-containing substance and subsequently heat-treated at up to 400° C. The heat treatment leads, on the one hand, to the formation of crystalline titanium dioxide and is intended, on the other hand, to induce a surface reaction of the carbon-containing compound in the form of partial decomposition and modification of the titanium dioxide particle surface.

The product manufactured contains carbon in quantities of 0.5 to 4% by weight, in a surface layer and on the surface of the titanium dioxide particles, and preferably display a specific surface area of 100 to 250 m²/g.

According to WO 2005/108505 A1, the heat treatment is performed in heat treatment units, such as rotary kilns, fluidized-bed reactors, fluidized-bed driers or heated plough-share mixers, in continuous mode, or sometimes also in batch mode. Although good product qualities can be obtained with these processing methods, it is not possible to achieve consistent product quality, i.e. reproducibility, over extended periods of time. The quality fluctuations are due to the temperature profiles and wide residence-time distributions occurring in the heat treatment unit. If temperature peaks occur at certain points in the heat treatment unit ("temperature hotspots"), uncontrolled degradation reactions of the organic compounds take place, up to the point of complete combustion of the organic compounds, as a result of which the photoactivity of the product, on the one hand, and its color, on the other, are impaired by intercalated carbon black. Moreover, agglomerates are easily formed, as a result of which complete combustion of the organic compounds can take place across particles in the event of temperature hotspots occurring.

For manufacturing metal-containing, specifically iron-containing, $TiO_2$ photocatalysts, EP 0 666 107 B1 discloses a method where an aqueous solution, containing a titanium compound and an iron compound, is hydrolyzed. The product is subsequently dried, or calcined at temperatures of up to 500° C.

WO 2012/139726 discloses a method for manufacturing iron-containing $TiO_2$ photocatalyst, where an aqueous suspension of titanium oxyhydrate nanoparticles and iron(III) ions is taken as the starting point, iron(III) hydrate is subsequently precipitated, and the particles are finally subjected to heat treatment (preferably at 100° C. to 400° C.). Both methods are based on a precipitation process that cannot be controlled uniformly and reproducibly, and thus cannot lead to a homogeneous product.

There is therefore a need for a method for manufacturing photocatalysts based on titanium dioxide containing carbon or metal, with the help of which consistently good product qualities can be produced, even over an extended period of time.

BRIEF DESCRIPTION OF THE INVENTION

The object of the invention is to provide a method for manufacturing photocatalysts based on titanium dioxide containing carbon or metal, with the help of which consistently good product qualities can be produced, even over an extended period of time.

The object is solved by a method for manufacturing a particulate photocatalyst, based on titanium dioxide containing carbon or metal, in a pulsation reactor, characterized in that a raw material mixture, consisting of an aqueous solution or suspension, containing at least one organic, carbon-containing compound or metal ions, and nanoparticulate titanium oxyhydrate, is fed into the pulsating hot-gas stream of a pulsation reactor, titanium dioxide particles containing carbon or metal are formed, and the particles are separated off, where the hot-gas stream contains an excess of oxygen and the temperature of the hot-gas stream following addition of the raw material mixture (treatment temperature T2) is ≥450° C.

Further advantageous embodiments of the invention are indicated in the sub-claims.

BRIEF DESCRIPTION OF THE FIGURES

For a more complete understanding of the present invention and for further advantages thereof, reference is now made to the following description taken in conjunction with the accompanying drawings in which:

FIG. 1 is a schematic flowchart of the process of the preferred embodiment.

DESCRIPTION OF THE PREFERRED EMBODIMENTS

The present invention can be better understood by the following discussion of the manufacture and use of certain preferred embodiments. All data disclosed below regarding time, temperature in ° C., amount of components, size in μm, concentration in % by weight or % by volume, pH value, etc.

are to be interpreted as also including all values lying in the range of the respective measuring accuracy known to the person skilled in the art. Unless otherwise stated, technical grades of the various materials were used in the preferred embodiments. The term "substantially free" is intended to connote that the particular material is not detected (i.e. is below the detection limit) using standard commercial tests and methodologies used in the industry as of the earliest priority date of this application The method according to the invention is based on a method, known from WO 2002/072471 A2, EP 2 092 976 B1 and DE 10 2007 003 744 A1, for manufacturing metal oxide powders in a pulsation reactor. The pulsation reactor method is characterized in that the manufactured products display reproducible, good quality and no coarse agglomerates. A pulsation reactor consists of a burner, a combustion chamber, a downstream resonance tube with a smaller cross-section of flow compared to the combustion chamber, and a suitable filter for separating the particles. The effective principle of a pulsation reactor is described in detail in the aforementioned patent specifications. A pulsating hot-gas stream is generated in the combustion chamber via a self-regulating system. In this context, the fuel gas and the combustion air in the combustion chamber are ignited, burn very rapidly and generate a blast wave in the direction of the resonance tube, as the fuel gas inlet into the combustion chamber is sealed off by aerodynamic valves in the presence of overpressure. The outflow of the hot gas into the resonance tube generates negative pressure in the combustion chamber, such that fresh fuel gas enters through the valves and is ignited.

As a result of the highly turbulent flow, the pulsating hot-gas stream offers the advantage of greatly increased heat transfer between the components of a reaction mixture added to the hot-gas stream, and thus a smooth chemical reaction within short residence times in the region of milliseconds to seconds.

The known methods for manufacturing metal oxide powders in a pulsation reactor according to WO 2002/072471 A2, EP 2 092 976 B1 and DE 10 2007 003 744 A1 are based on the conversion of a raw material mixture of metal salts or metals into the corresponding metal oxides, where the raw material components are combined in the corresponding stoichiometric ratio. DE 10 2006 046 806 B4 moreover discloses a version of the method for in-situ coating of the particles with inorganic and/or organic components. The in-situ coating is performed by adding a suitable coating component to the hot-gas stream in an area located downstream of the point of addition of the raw material mixture for particle formation. The hot-gas stream is cooled in this area, e.g. to below 300° C., during the application of an organic coating.

In contrast, the method according to the invention for manufacturing titanium dioxide containing carbon or metal is characterized in that the raw material mixture fed into the pulsation reactor contains both nanoparticulate titanium oxyhydrate, as the starting material for the titanium dioxide particles to be generated, as well as the precursor for modification of the titanium dioxide particles to be generated, in the form of an aqueous solution or suspension. In the context of the invention, "modification" means that the modification substance is at least partly intercalated into the surface layer of the titanium dioxide particles.

As used here, the terms "carbon-modified" and "metal-modified" are equivalent to the terms "carbon-containing" and "metal-containing".

One embodiment of the present invention relates to the production of carbon-containing titanium dioxide and is based on the manufacturing method known from WO 2005/108505 A1 for a carbon-containing photocatalyst based on titanium dioxide, according to which a titanium compound is mixed with an organic carbon compound and the mixture is heat-treated at a temperature of up to 400° C. in an oxidizing atmosphere. This leads to the formation of titanium dioxide particles, as well as to partial oxidative decomposition/reaction of the organic carbon compound. The remaining carbon component (final carbon content) is chemisorbed or intercalated on the surface or in a surface layer of the titanium dioxide particles.

It became apparent that the heat treatment is the most important quality-influencing step for the photocatalytic activity of the carbon-containing end product. However, the oxidation reaction of the organic carbon compound does not take place smoothly and reproducibly in the customary heat treatment units, such as rotary kilns, fluidized-bed reactors, fluidized-bed driers or heated ploughshare mixers, because both the temperature (temperature hotspots) and the oxygen, as well as the titanium compound and the carbon compound, are not homogeneously distributed in the units. Emerging temperature hotspots cause uncontrolled exothermic decomposition or irreversible incineration of the organic carbon compound.

In addition, the strong tendency to agglomerate of the particles is intensified in the aforementioned methods. Since the aforementioned heat treatment units contain piles of material with the organic carbon compounds being adhered to the surface across agglomerates, the exothermic decomposition of the organic carbon compound spreads to the entire product volume, as a result of which entire production batches of greatly reduced quality can be obtained.

In contrast, the method according to the invention permits a controlled oxidation reaction of the organic, carbon-containing compound in the mixture of titanium oxyhydrate/carbon-containing compound, as a result of which reproducibly good product qualities can be obtained.

Surprisingly, the method according to the invention achieves reproducible final carbon contents, and thus a consistently good product quality of the $TiO_2$-based photocatalysts, although the treatment temperature is higher that the previously applied temperature ($\geq 450°$ C. compared to a maximum of 400° C. in WO 2005/108505 A1) and thus well above the decomposition temperature of the organic, carbon-containing compounds used. In addition, the pulsation of the fuel gas largely breaks up all agglomerates into their primary particles, as a result of which the uncontrolled, surface-overlapping decomposition of the organic carbon compound is prevented and optimum distribution of the oxygen, the titanium compound and the organic carbon compound is obtained.

A further embodiment of the present invention relates to the production of metal-containing titanium dioxide and is based on the manufacturing method known from WO 2012/139726 A1 for an iron-containing photocatalyst based on titanium dioxide, according to which iron(III) ions are added to an aqueous suspension of titanium oxyhydrate nanoparticles, iron(III) hydrate is precipitated, and the mixture of titanium oxyhydrate and iron(III) hydrate is heat-treated at a temperature of at least 100° C.

The method according to the invention is based on a raw material mixture containing nanoparticulate titanium oxyhydrate. In the context of the invention, titanium oxyhydrate is also taken to mean amorphous or semi-crystalline titanium oxide or hydrous titanium oxide and/or titanium hydrate or hydrated titanium oxide or metatitanic acid. Titanium oxyhydrate can, for example, be produced when manufacturing titanium dioxide by the sulfate process. It is, for example, precipitated in the form of nanoparticles during the hydrolysis of titanyl sulfate or titanyl chloride.

According to the invention, the titanium oxyhydrate is used in powder form or as an aqueous suspension with a solids content of at least 10% by weight, particularly 20 to 40% by weight.

The titanium oxyhydrate preferably has a BET surface of at least 50 m$^2$/g, preferably a BET surface of roughly 150 to 350 m$^2$/g.

In a special embodiment of the invention, sulfuric titanium oxyhydrate from the sulfate process for titanium dioxide production is used, having previously been neutralized and washed, such that the sulfate content of the solids after drying is <1% by weight, calculated as $SO_3$.

In principle, all hydrocarbons with at least one functional group are suitable as the organic, carbon-containing compound for producing the carbon-containing titanium dioxide particles. The functional group can be OH; CHO; COOH; $NH_x$; $SH_x$; COOR, where R is an alkyl or aryl residue. Succinic acid, glycerol or ethylene glycol is open to consideration, for example. Sugars or other carbohydrates can also be used, as can organoammonium hydroxides, particularly tetraalkylammonium. Mixtures of the aforementioned compounds are also suitable. Preferably used are water-soluble polyalcohols with a carbon/oxygen ratio of roughly 0.7 to 1.5, preferably of roughly 1. Particularly suitable are pentaerythritol and citric acid.

The raw material mixture according to the invention for manufacturing carbon-containing titanium dioxide particles is preferably produced as follows: a defined quantity of water is put into an agitated vessel, and the organic carbon compound is completely dissolved in it. If necessary, the solution is heated to achieve complete dissolution of the carbon compound.

A defined quantity of titanium oxyhydrate is subsequently added, either in powder form or as a previously slurried suspension, and homogenized. A high-performance mixer (e.g. jet mixer) is preferably used.

The carbon compound is preferably added in quantities of 1.5 to 4% by weight, particularly 2 to 2.5% by weight, calculated as carbon and referred to titanium oxyhydrate (solids). The solids content of the suspension is preferably at least 10% by weight, particularly 20 to 40% by weight.

According to the invention, the procedure for manufacturing metal-containing titanium dioxide particles, particularly iron-containing titanium dioxide particles, is preferably as follows: the raw material mixture is produced by slurrying a defined quantity of water and a defined quantity of nanoparticulate titanium oxyhydrate into a suspension in an agitated vessel, and subsequently mixing and homogenizing it with the aqueous solution of a metal salt (metal compound). The metal salt solution contains the metal ions with which the $TiO_2$ photocatalyst particles are to be modified. The metal salt is preferably added in quantities of 0.01 to 0.1% by weight, particularly 0.01 to 0.05% by weight, calculated as metal and referred to titanium oxyhydrate.

The solids content of the suspension is preferably at least 10% by weight, particularly 20 to 40% by weight.

In the event of modification with iron, the iron is used in trivalent form. Particularly suitable is a solution of iron(III) sulfate, for example. In a special embodiment of the invention, a quantity of 0.01 to 0.1% by weight Fe(III), preferably 0.01 to 0.05% by weight Fe(III), referred to titanium oxyhydrate (solids), is added. The iron salt solution has a concentration of 12.5% by weight Fe(III), for example.

The raw material mixture containing metal salt, like the raw material mixture containing carbon, is heat treated in a pulsation reactor, as described below.

According to the invention, the heat treatment unit used is a pulsation reactor of the kind described in WO 2002/072471 A2 or EP 2 092 976 B1 or DE 10 2007 003 744 A1 and schematically illustrated in FIG. 1. The pulsation reactor essentially consists of a burner (1), a combustion chamber (2), a downstream resonance tube (6) and a particle separator (8). Fuel gas (3) and combustion air (4) are fed into the burner (1) and ignited in the combustion chamber (2). The fuel gas burns very rapidly and generates a blast wave in the direction of the resonance tube (6), as the fuel gas inlet into the combustion chamber (2) is sealed off by aerodynamic valves in the presence of overpressure. The outflow of the hot gas (5) into the resonance tube (6) generates negative pressure in the combustion chamber (2), such that fresh fuel gas enters through the valves and is ignited. A pulsating hot-gas stream with a temperature T1 (combustion chamber temperature) is created in this way.

The raw material mixture (7) is fed into the pulsating hot-gas stream at the inlet of the resonance tube. The following steps subsequently take place during the heat treatment of the raw material mixture: the suspension (raw material mixture) is dried in the hot-gas stream, and the dissolved or suspended modification substance (carbon compound or metal compound) is precipitated/crystallizes and is adsorbed on the surface of the titanium oxyhydrate particles. The hot gas has a temperature T2 (treatment temperature) after introduction of the raw material mixture. The carbon compound is partially decomposed (oxidized) under the prevailing temperature conditions. The metal compound is converted into the corresponding metal oxide. The titanium oxyhydrate particles are converted into crystalline titanium dioxide particles, in which context the modification substance is partially intercalated in layers of the particles close to the surface. According to the invention, the treatment temperature is ≥450° C., preferably ≥450° C. to 950° C. The carbon-containing titanium dioxide particles, in particular, are preferably produced at treatment temperatures of ≥450° C. to roughly 550° C. The metal-containing titanium dioxide particles are preferably produced at treatment temperatures of 500° C. to 950° C., particularly 550° C. to 900° C. and particularly preferably at 550° C. to 800° C.

The particles are subsequently separated from the gas stream in the particle separator (8), e.g. in a suitable bag filter. The residence time of the particles in the hot-gas stream is just a few seconds.

According to the invention, carbon-containing photocatalyst particles based on titanium dioxide can be manufactured with optimized photocatalytic activity and reproducible quality, if treatment temperature T2 is in the range of roughly ≥450° C. to 550° C. and the hot-gas stream contains an excess of oxygen, referred to the targeted oxidation reaction of the organic carbon compound, in which context the oxygen content is controlled via the volumetric flow rate of the hot gas.

A further operating parameter of the method according to the invention is the frequency of the pulsating hot-gas stream. The frequency, the volumetric flow rate and the geometry of the resonance tube (length, diameter) determine the residence time of the particles and the carbon compound in the reactor.

A measure of the targeted photocatalytic activity of the carbon-containing particles is the carbon content in the end product. With a given composition of the raw material mixture, the person skilled in the art will set the parameters temperature of the hot gas before addition of the material (combustion chamber temperature T1), temperature of the hot gas after addition of the material (treatment temperature T2), volumetric flow rate, frequency, throughput and residence time in such a way that a previously defined carbon content is achieved in the end product (final carbon content). The following dependences exist in this context:

Faster carbon oxidation, i.e. lower final carbon contents, are achieved, for example, by increasing the temperature within the given treatment temperature range of ≥450° C. to 550° C., or by increasing the frequency, this resulting in greater turbulence and an accelerated reaction. Furthermore, lower final carbon contents are achieved if the residence time is prolonged, e.g. by modifying the reactor geometry or reducing the volumetric flow rate. However, the volumetric flow rate may only be reduced to such an extent that the oxygen excess is still maintained.

Accordingly, higher final carbon contents can, for example, be achieved by increasing the volumetric flow rate, this reducing the residence time, or by increasing the throughput, in which case the temperature is lowered by the evaporation of larger quantities of water.

In a special embodiment of the invention for manufacturing carbon-containing titanium dioxide particles, the raw material mixture used is an aqueous suspension of nanoparticulate titanium oxyhydrate and pentaerythritol as the organic carbon compound with a carbon content of 2 to 2.5% by weight, referred to solids, and the operating parameters are set in such a way that a final carbon content of 0.3 to 1.5% by weight, preferably 0.8 to 1.2% by weight, is achieved.

The method according to the invention for manufacturing carbon-containing titanium dioxide particles is characterized in that the titanium oxyhydrate particle agglomerates present in the suspension of the raw material mixture, and fed into the pulsating hot-gas stream, are optimally disintegrated by the strong pulses, all the way down to primary particles. The organic carbon compound adsorbed on the particle surface can be uniformly decomposed by oxidation as a result of the oxygen excess. The pulsation additionally minimizes temperature and concentration gradients, this being why the oxidation reaction can be performed within a few seconds, e.g. within 3 seconds. This achieves uniform quality of the end product.

The photocatalytic efficiency of the iron-containing titanium dioxide particles in relation to the degradation of nitrogen monoxide is linked to the specific surface area of the particles (see Example 2). The method according to the invention permits the targeted production of metal-containing titanium dioxide particles with a predefined specific surface area.

A further advantage of the method according to the invention is that drying of the aqueous suspension takes place at the same time as heat treatment in the pulsation reactor, thus avoiding an expensive, separate drying step.

EXAMPLES

The invention is described in more detail on the basis of the examples below, although this is not intended to limit the scope of the invention.

Example 1

Production of Carbon-Containing Titanium Dioxide Particles

To produce the raw material mixture, 650 kg water at a temperature of 20° C. were put into a vessel and, while stirring, 17.5 kg pentaerythritol were added and completely dissolved. This was followed by addition, while stirring, of 350 kg nanoparticulate titanium oxyhydrate from the sulfate process for titanium dioxide production with a sulfate content of roughly 0.3% by weight, referred to dry solids. The suspension (raw material mixture) contained 35% by weight solids and 2.2% by weight carbon, referred to titanium oxyhydrate.

The raw material mixture was introduced into a pulsation reactor according to EP 2 092 976 B1 and heat-treated.

The operating conditions for the individual tests (throughput, volumetric flow rate, frequency, combustion chamber temperature T1, treatment temperature T2) are shown in Table 1, together with the properties (carbon content, photocatalytic activity and brightness L) measured on the photocatalyst particles produced.

TABLE 1

| No. | Throughput (kg/h) | Volum. flow rate (m³/h) | Frequency (Hz) | Comb. chamber temp. T1 (° C.) | Treatment temp. T2 (° C.) | Carbon content (% by wt.) | Photocat. activity | L |
|---|---|---|---|---|---|---|---|---|
| 1-1 | 70 | 21 | 55.6 | 867 | 550 | 1.18 | 102 | 90 |
| 1-2 | 120 | 26 | 70.5 | 833 | 515 | 0.87 | 94 | 89 |
| 1-3 | 120 | 25 | 71.2 | 830 | 485 | 0.93 | 102 | 88 |
| 1-4 | 140 | 23.5 | 71.4 | 770 | 500 | 1.24 | 89 | 86 |
| 1-5 | 140 | 27 | 71.0 | 846 | 530 | 0.92 | 102 | 88 |
| 1-6 | 160 | 27 | 72.1 | 845 | 515 | 0.96 | 106 | 86 |

Example 2

Production of Iron-Containing Titanium Dioxide Particles

To produce the raw material mixture, 540 kg water at a temperature of 20° C. were put into a vessel and, while stirring, 225 kg nanoparticulate titanium oxyhydrate from the sulfate process for titanium dioxide production with a sulfate content of roughly 0.3% by weight, referred to dry solids, were added. This was followed by addition, while stirring, of 0.18 kg of an aqueous iron(III) sulfate solution (concentration 12.5% by weight iron(III) ions). The suspension (raw material mixture) contained 29% by weight solids and 0.01% by weight iron, referred to titanium oxyhydrate.

The raw material mixture was introduced into a pulsation reactor according to EP 2 092 976 B1 and heat-treated.

The operating conditions for the individual tests (throughput, combustion chamber temperature T1, treatment temperature T2) are shown in Table 2, together with the properties (iron content, BET surface, photocatalytic activity expressed as NO degradation) measured on the photocatalyst particles produced.

TABLE 2

| No. | Throughput (kg/h) | Comb. chamber temperature T1 (° C.) | Treatment temp. T2 (° C.) | Fe content (ppm) | BET (m$^2$/g) | NO degrad. (% by vol.) | NO$_x$ degrad. (% by vol.) |
|---|---|---|---|---|---|---|---|
| 2-1 | 40 | 882 | 720 | 79 | 99 | 60 | 32 |
| 2-2 | 40 | 806 | 720 | 221 | 103 | 63 | 30 |
| 2-3 | 40 | 885 | 720 | 360 | 99 | 63 | 29 |
| 2-4 | 60 | 837 | 600 | 81 | 183 | 65 | 37 |
| 2-5 | 60 | 808 | 600 | 243 | 178 | 64 | 35 |
| 2-6 | 60 | 823 | 600 | 391 | 185 | 69 | 35 |

Test Methods

Carbon Content

The carbon content is determined by means of a LECO C-200 carbon analyzer.

Iron Content

The iron content of the particles was determined by X-ray fluorescence.

BET Surface

The BET surface was measured with a Tristar 3000 from Messrs. Micromeritics by the static volumetric principle.

Photocatalytic Activity

The photocatalytic activity is determined on the basis of the degradation rate of 4-chlorophenol (4-CP) when exposed to light. To this end, a suspension of 300 mg photocatalyst in 100 g of an aqueous 0.1 mmol/l 4-CP solution is prepared, stirred in the dark and subsequently irradiated with blue (455 nm) or ultraviolet light (365 nm), during which time the degradation of the 4-CP is determined as a function of time (0 to 90 min.) by means of a UV/Vis photometer at a wavelength of 223 nm. The activity (dimensionless) is calculated from the negative slope constant "k" of the logarithmic degradation curve, multiplied by 6,000. The standard deviation is 6, the simple standard deviation being 11.

NO/NO$_x$ Degradation

The photocatalytic degradation of nitrogen oxide (NO, NO$_x$) is determined in accordance with ISO 22197-1 (1st edition, Jan. 9, 2007). The measurement is based on the following principle: air with a defined NO content is passed over the sample in a continuous photochemical reactor, the NO is adsorbed on the sample surface and oxidized into nitric acid or nitrate by UV irradiation. Since part of the NO is converted into NO$_2$ on the particle surface, the following value is obtained for the total removal of nitrogen oxides (NO$_R$) from the air stream: NO$_x$ degradation=NO (degraded) minus NO$_2$ (formed) in % by volume. The degraded quantity of NO (NO degradation) is obtained from the difference between the original NO concentration and the remaining quantity of NO in the air stream. The NO and NO$_2$ quantities are measured by means of chemiluminescence (according to ISO 7996).

Brightness L

To measure the brightness L, a powder tablet is produced and the reflectance values are measured with a PD-9000 colorimeter. The L-values derived therefrom are referred to an internal standard.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A method for manufacturing a particulate photocatalyst, based on titanium dioxide containing carbon or metal, in a pulsation reactor, comprising:
   feeding a raw material mixture, containing at least one organic, carbon-containing compound or metal ions, and nanoparticulate titanium oxyhydrate, into a pulsating hot-gas stream of a pulsation reactor,
   forming titanium dioxide particles containing carbon or metal;
   separating the formed titanium dioxide particles from the gas stream;
   wherein the raw material mixture is an aqueous solution or suspension;
   wherein the hot-gas stream contains an excess of oxygen; and
   wherein the temperature of the hot-gas stream following addition of the raw material mixture is at least about 450° C.

2. The method of claim 1 wherein the form of the titanium oxyhydrate that is added to the raw material mixture is selected from the group consisting of a powder or an aqueous suspension with a solids content of at least about 10% by weight.

3. The method of claim 2 wherein the form of the titanium oxyhydrate is an aqueous suspension having a solids content of from about 20 to about 40 percent by weight.

4. The method of claim 1 wherein the organic carbon-containing compound is present in the form of an aqueous solution.

5. The method of claim 4 wherein the organic carbon-containing compound is a hydrocarbon with at least one functional group, wherein a functional group is selected from the group consisting of OH, CHO, COOH, NH$_x$, SH$_x$, COOR, where R is an alkyl or aryl residue.

6. The method of claim 5 wherein the organic carbon-containing compound is selected from the group of water soluble polyalcohols with a carbon to oxygen ratio of about 0.7 to about 1.5.

7. The method of claim 6 wherein the organic carbon-containing compound is pentaerythritol or citric acid.

8. The method of claim 1 wherein the raw material mixture is an aqueous suspension of titanium oxyhydrate and pentaerythritol with a carbon content of about 1.5 to about 4 percent by weight, referred to titanium oxyhydrate.

9. The method of claim 8 wherein the carbon content is from about 2 to about 2.5 percent by weight, referred to titanium oxyhydrate.

10. The method of claim 1 wherein the formed titanium dioxide particles have a carbon content of from about 0.3 to about 1.5 percent by weight.

11. The method of claim 10 wherein the formed titanium dioxide particles have a carbon content of from about 0.8 to about 1.2 percent by weight.

12. The method of claim 1 wherein the temperature of the hot-gas stream after addition of the raw material mixture is greater than about 450° C.

13. The method of claim 12 wherein the temperature of the hot-gas stream after addition of the raw material mixture is from about 450 to about 550° C.

14. The method of claim 1 wherein the raw material mixture is an aqueous suspension of titanium oxyhydrate and metal ions in an amount of from about 0.01 to 0.1 percent by weight, referred to titanium oxyhydrate.

15. The method of claim 14 wherein the raw material mixture is an aqueous suspension of titanium oxyhydrate and metal ions in an amount of from about 0.01 to 0.05 percent by weight, referred to titanium oxyhydrate.

16. The method of claim 14 wherein the temperature of the hot-gas stream after addition of the raw material mixture is from about 500 to about 950° C.

17. The method of claim 16 wherein the temperature of the hot-gas stream after addition of the raw material mixture is from about 550 to about 900° C.

18. The method of claim 16 wherein the temperature of the hot-gas stream after addition of the raw material mixture is from about 550 to about 800° C.

19. The method of claim 14 wherein the raw material mixture is an aqueous suspension of titanium oxyhydrate and iron (III) ions in an amount of from about 0.01 to 0.05 percent by weight, referred to titanium oxyhydrate.

20. The method of claim 14 wherein the metal ions are iron (III) ions.

21. The method of claim 1 wherein the raw material mixture is an aqueous suspension of titanium oxyhydrate and iron (III) ions in an amount of from about 0.01 to 0.1 percent by weight, referred to titanium oxyhydrate.

22. The method of claim 1 wherein the formed titanium dioxide particles have an iron (III) content of from about 0.01 to 0.1 percent by weight.

23. The method of claim 22 wherein the formed titanium dioxide particles have an iron (III) content of from about 0.01 to 0.05 percent by weight.

24. The method of claim 1 wherein the formed titanium dioxide particles are used as a photocatalyst for the degradation of nitrogen oxides.

25. The method of claim 1 wherein the titanium oxyhydrate has a specific surface area (BET) of at least about 50 $m^2/g$.

26. The method of claim 25 wherein the titanium oxyhydrate has a specific surface area (BET) of from about 150 to about 350 $m^2/g$.

* * * * *